(12) United States Patent
Ericson et al.

(10) Patent No.: US 9,398,547 B2
(45) Date of Patent: Jul. 19, 2016

(54) METHOD AND ARRANGEMENT FOR POWER SHARING IN A BASE STATION (75) Inventors: Mårten Ericson, Luleå (SE); Arne Simonsson, Gammelstad (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 184 days.

(21) Appl. No.: 13/883,002

(22) PCT Filed: Nov. 4, 2010

(86) PCT No.: PCT/SE2010/051202
§ 371 (c)(1),
(2), (4) Date: May 2, 2013

(87) PCT Pub. No.: WO2012/060750
PCT Pub. Date: May 10, 2012

(65) Prior Publication Data
US 2013/0225227 A1    Aug. 29, 2013

(51) Int. Cl.
*H04M 1/00* (2006.01)
*H04W 52/34* (2009.01)
(Continued)

(52) U.S. Cl.
CPC .......... *H04W 52/346* (2013.01); *H04W 52/143* (2013.01); *H04W 52/225* (2013.01); *H04W 52/34* (2013.01); *H04W 52/367* (2013.01); *H04W 52/16* (2013.01); *H04W 52/223* (2013.01); *H04W 52/228* (2013.01); *H04W 52/24* (2013.01); *H04W 52/343* (2013.01); *H04W 52/38* (2013.01); *H04W 88/10* (2013.01)

(58) Field of Classification Search
CPC ... H04W 52/346; H04W 52/24; H04W 52/50; H04W 52/367
USPC .................. 455/522, 500, 69, 127.1; 370/329
See application file for complete search history.

(56) References Cited

U.S. PATENT DOCUMENTS 8,446,849 B2 * 5/2013 Damnjanovic ...... H04W 52/146
                                                    370/311
8,731,497 B2 * 5/2014 Backman ............ H04W 52/281
                                                    455/127.1

(Continued)

FOREIGN PATENT DOCUMENTS

EP           2075923      * 1/2009  ............ H04B 7/005
EP         2 075 923 A1    7/2009

(Continued)

OTHER PUBLICATIONS

International Search Report, PCT/SE2010/051202, Jun. 30, 2011.

(Continued)

*Primary Examiner* — MD Talukder
(74) *Attorney, Agent, or Firm* — Myers Bigel & Sibley, P.A.

(57) ABSTRACT

A method in a base station for calculating a power relating to a first radio access is provided. The power is to be shared with a second radio access within the base station. The base station communicates with a number of user equipments using the first radio access. When the base station has estimated a statistic power distribution of transmit power to said user equipments during a time interval, it calculates a margin of power not to be shared with the second radio access, based on the estimated statistic power distribution. The base station further calculates a power to be shared with the second radio access, based on said margin of power.

18 Claims, 6 Drawing Sheets

(51) Int. Cl.
*H04W 52/14* (2009.01)
*H04W 52/22* (2009.01)
*H04W 52/36* (2009.01)
*H04W 52/24* (2009.01)
*H04W 88/10* (2009.01)
*H04W 52/38* (2009.01)
*H04W 52/16* (2009.01)

(56) References Cited

U.S. PATENT DOCUMENTS

| | | | | |
|---|---|---|---|---|
| 2004/0047309 A1* | 3/2004 | Barnes | ............... | H04W 52/34 370/329 |
| 2009/0047987 A1* | 2/2009 | Li | ............... | H04W 72/1257 455/522 |
| 2010/0214966 A1* | 8/2010 | Hu | ............... | H04W 72/085 370/311 |
| 2011/0002285 A1* | 1/2011 | Kim | ............... | H04L 5/0007 370/329 |
| 2011/0021236 A1* | 1/2011 | Dinan | ............... | H04W 52/262 455/522 |
| 2011/0075594 A1* | 3/2011 | Burstrom | ............... | H04W 52/10 370/280 |
| 2011/0275405 A1* | 11/2011 | Backman | ............... | H04W 52/281 455/522 |
| 2012/0188947 A1* | 7/2012 | Larsson | ............... | H04W 52/146 370/328 |
| 2012/0264378 A1* | 10/2012 | Steele | ............... | H04B 17/13 455/73 |
| 2013/0029657 A1* | 1/2013 | Gao | ............... | H04W 74/004 455/422.1 |
| 2013/0225227 A1* | 8/2013 | Ericson et al. | ............... | 455/522 |
| 2014/0128117 A1* | 5/2014 | Kwun | ............... | H04W 52/243 455/513 |

FOREIGN PATENT DOCUMENTS

| | | |
|---|---|---|
| WO | WO 01/15335 A1 | 3/2001 |
| WO | WO 2010/042000 A1 | 4/2010 |
| WO | WO 2010/095985 A1 | 8/2010 |
| WO | WO 2010095985 A1 * | 8/2010 ............ H04W 52/34 |

OTHER PUBLICATIONS

Extended European Search Report Corresponding to European Application No. 10859335.1; Dated: Oct. 20, 2015; 6 pages.

* cited by examiner

METHOD AND ARRANGEMENT FOR POWER SHARING IN A BASE STATION

CROSS REFERENCE TO RELATED APPLICATION

This application is a 35 U.S.C. §371 national stage application of PCT International Application No. PCT/SE2010/051202, filed on 4 Nov. 2010, the disclosure and content of which is incorporated by reference herein in its entirety. The above-referenced PCT International Application was published in the English language as International Publication No. WO 2012/060750 A1 on 10 May 2012.

TECHNICAL FIELD

Embodiments herein relates to a base station and method in a base station. In particular, it relates to calculating a power relating to a first radio access within the base station, which power is to be shared with a second radio access within the base station.

BACKGROUND

In a typical cellular radio system, also referred to as a wireless communication system, user equipments, also known as mobile terminals and/or wireless terminals communicate via a Radio Access Network (RAN) to one or more core networks. The user equipments may be mobile stations or user equipment units such as mobile telephones also known as "cellular" telephones, and laptops with wireless capability, e.g., mobile termination, and thus may be, for example, portable, pocket, hand-held, computer-included, or car-mounted mobile devices which communicate voice and/or data with radio access network.

The radio access network covers a geographical area which is divided into cell areas, with each cell area being served by a base station, e.g., a Radio Base Station (RBS), which in some networks is also called "eNB", "eNodeB", "NodeB" or "B node" and which in this document also is referred to as a base station. A cell is a geographical area where radio coverage is provided by the radio base station equipment at a base station site. In some versions of the radio access network, several base stations are typically connected, e.g., by landlines or microwave, to a Radio Network Controller (RNC). The radio network controller, also sometimes termed a Base Station Controller (BSC), supervises and coordinates various activities of the plural base stations connected thereto. The radio network controllers are typically connected to one or more core networks.

A cellular telephone network according to the Long Term Evolution (LTE) 3GPP specifications is an example of a telecom network of today. The LTE specifications may be seen as an evolution of the current Wideband Code Division Multiple Access (WCDMA) specifications. An LTE system uses Orthogonal Frequency Division Multiplex (OFDM) as a Multiple Access Technique, called Orthogonal Frequency Division Multiple Access (OFDMA) in the Down Link (DL).

Different user equipments use the different standards such as GSM, WCDMA and LTE. With a single multi-standard base station it may be possible to support multiple accesses depending on which access-specific equipment it comprises. For example, a multi-standard radio base station may support GSM, WCDMA and LTE accesses. A necessary requirement is a power amplifier that can transmit to any access. A carrier here is meant one carrier frequency, that for example may be a 200 kHz Broadcast Channel (BCH) or Traffic Channel (TCH) for GSM, a 5 MHz wideband carrier for WCDMA or a LTE carrier of 5, 10 of 20 MHz.

This multi-access base station design opens for a change of power used by each carrier, so-called power reallocation, between accesses on the same base station. Different levels of reallocation, i.e. how often the power used by each carrier requires to be changed, may be envisioned from slow, i.e. on hour basis, e.g. by utilizing different levels of power reallocation in busy hour and in non busy hour, to fast on millisecond (ms) basis. In GSM the shortest time interval is called time-slot, and is 0.577 ms. For transmitting voice, each user equipment uses typically one time-slot to transmit the code voice bits. This time-slot is repeated every $8^{th}$ time-slot, and thus 8 time-slots creates what is called a frame. In WCDMA and LTE the shortest time unit is called Transmission Time Interval (TTI). To utilize DTX variations and power allocation, the fastest power reallocation is required, i.e. per TTI and/or per timeslot, since in a time slot with DTX no power is required, since it is not possible beforehand to know when a user equipment starts to utilize DTX. Hour timescale is used to follow traffic variations such as busy hour. DTX is a method of momentarily powering-down, or muting, a user equipment or a base station when there is no voice or data input to the user equipment or to the base station. This optimizes the overall efficiency of a wireless communications system, conserves battery power and reduces interference. When reaching maximum total power within the base station, also Quality of Service (QoS) requirement differences may be utilized. The power is reallocated from the access with lowest QoS on the users, which users then will get reduced transmission power. The power is reallocated to the access with higher quality of service requirements on the users. For example: if GSM only carries voice with high QoS requirements and LTE have some users with best-effort file downloading, the power is reallocated from LTE to GSM.

Figure 1:
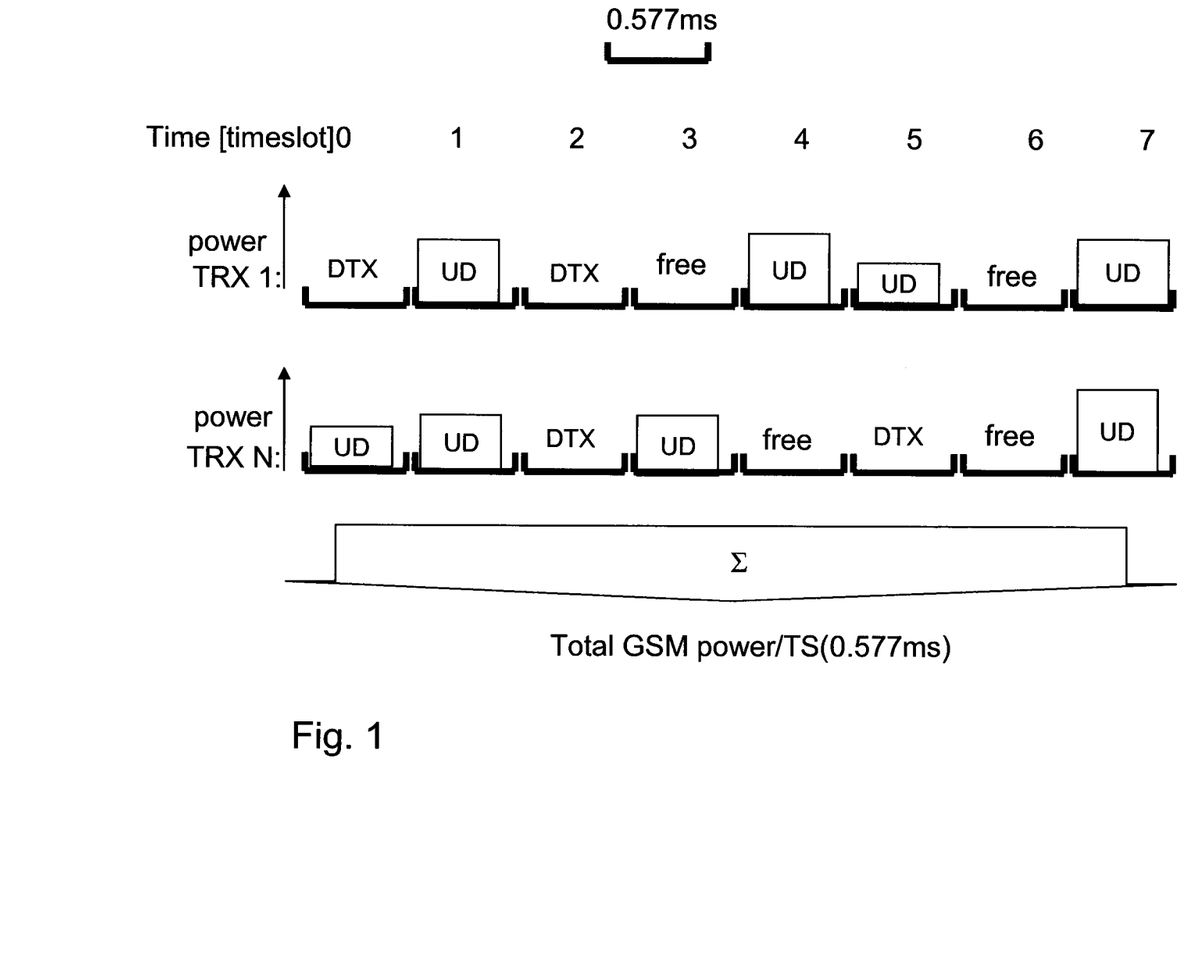
FIG. 1 is a schematic block diagram illustrating GSM time-slot and frequency structure according to prior art.

FIG. 1 shows an example of a GSM time-slot (TS) and frequency structure. Time slots 0 to 7 are shown horizontal in FIG. 1. Each GSM frequency requires a transceiver (TRX), where two transceivers TRX 1 and TRX N are shown vertical in FIG. 1. In some of the time slots DTX is performed, and some time slots are free, i.e. there is no user allocated to them. In these time slots no power is required. In some time slots User Data (UD) such as e.g. data or voice is transmitted, in these time slots power is required. In this example, the high of the PC box in each time slot and transceiver represents the power used by the transceiver in this time slot. Please note that in WCDMA and LTE it is more common to refer to carrier instead of TRX.

From FIG. 1 the variations in the total GSM transmit power and corresponding time frame are shown for the transceivers, i.e. for TRX1 and TRXN altogether for each time frame. The requirement for allocation and or reallocation will follow the variations in the total GSM transmit power.

Ideally, for the best efficiency the allocation and reallocation of power between GSM and any other access should be as fast as possible. A TS in GSM is 0.577 ms which is then an ideal basis to react on for allocation and/or reallocation. For LTE the most efficient would then be to react on 1 ms basis, or alternatively to react on a GSM frame basis, around 5 ms. GSM has a power plan 8 TSs ahead, i.e. in GSM power is planned 8 TSs ahead, and therefore it is possible to know beforehand which of the 8 TSs that has the highest total transmit power over all TRX:s, and use this for a limit of the shared power and share the rest up to maximum of all GSM TRX:s, see FIG. 2.

Figure 2:
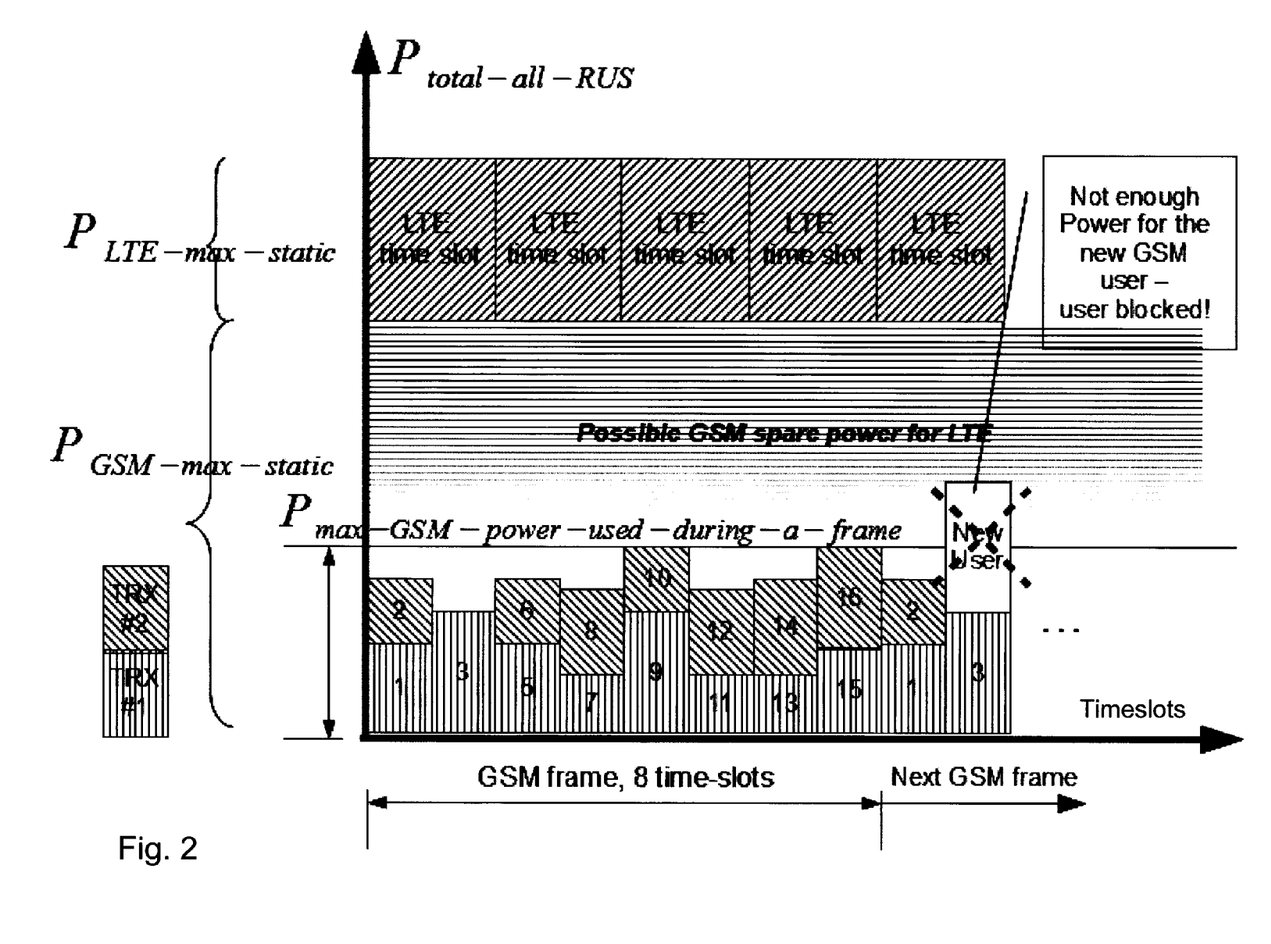
FIG. 2 is a schematic diagram illustrating power sharing according to prior art.

FIG. 2 depicts a schematic scheme of fast power sharing between GSM and LTE. The vertical axis represents power and the horizontal axis represents time slots. The lower part of FIG. 2 represents GSM with two transceivers TRX #1 and TRX #2. In FIG. 2 boxes are depicted. Each box has a number representing transmit power of a user equipment numbered with that number. Boxes 1, 3, 5, 7, 9, 11, 13 and 15 in GSM time slots in the first GSM frame, and boxes 1 and 3 in GSM time slots in the next GSM frame, represents transmit power used for that respective time slot by TRX #1. Boxes 2, 6, 8, 10, 12, 14, and 16, in the GSM time slots in the first GSM frame, and box 2 in a GSM time slot in the next GSM frame represents transmit power used for that time slot by TRX #2. The upper part of FIG. 2 represents LTE and shows five LTE time slots. Each LTE time slot is represented by a box wherein the height of each box represent the maximum power used in this time slot since in this example it is assumed that the LTE always tries to transmit with maximum, serving very high bit-rate demanding services such as downloading a file, with no upper limit of the maximum bit rate, i.e. $P_{max\ LTE\text{-}static}$.

In order to avoid sharing every GSM time slot of 0.577 ms, the maximum total power during a GSM frame, i.e. $P_{max\ GSM\text{-}power\text{-}used\text{-}during\text{-}a\text{-}frame}$ is used as the "limit" for power sharing. The rest of the power, i.e. the power from $P_{max\ GSM\text{-}power\text{-}used\text{-}during\text{-}a\text{-}frame}$ up to $P_{max\ GSM\text{-}static}$, may be shared by LTE or WCDMA. Where $P_{max\ GSM\text{-}static}$ is the total power that is allocated for GSM.

However, the power sharing may be a rather slow process e.g. in the order of 10-20 s. There may be several reasons for this. First, it may be the hard-ware that limits the process speed. Also, it may be beneficial to do the power sharing or power reallocation rather seldom in order to not jeopardize the system stability due to e.g. too fast changes in transmit power. To share all GSM excess power to LTE/WCDMA may therefore lead to bad QoS for the GSM system since an existing GSM speech service may suddenly need the shared power, or a new GSM user arrives suddenly to the system and requires transmit power.

Relating to FIG. 2, assume for example that GSM shares all available power with LTE, where the maximum total power i.e. $P_{max\ GSM\text{-}power\text{-}used\text{-}during\text{-}a\text{-}frame}$ during a GSM frame is used as the "limit" for power sharing. The rest of the power, may be shared by LTE or WCDMA, i.e. the power from $P_{max\ GSM\text{-}power\text{-}used\text{-}during\text{-}a\text{-}frame}$ up to $P_{max\ GSM\text{-}static}$. This assumes that the power scheme may be altered every GSM frame. If that is not the case, a new GSM user may arrive which requires more total transmit power for that time slot than is available for GSM at the moment, i.e. the second time slot FIG. 2. This user must most probably be blocked. I.e. a problem with power sharing is that if the power sharing is relatively slow, e.g. slower than ~5-10 ms, it is not possible to share all unused GSM power to LTE and still maintain the GSM QoS.

SUMMARY

It is therefore an object of embodiments herein to provide a base station and a method in the base station that improves radio access performance.

According to a first aspect of embodiments herein, the object is achieved by a method in a base station for calculating a power relating to a first radio access. The power is to be shared with a second radio access within the base station. The base station communicates with a number of user equipments using the first radio access. When the base station has estimated a statistic power distribution of transmit power to said user equipments during a frame, it calculates a margin of power not to be shared with the second radio access, based on the estimated statistic power distribution. The base station further calculates a power to be shared with the second radio access, based on said margin of power.

According to a second aspect of embodiments herein, the object is achieved by a base station for calculating a power relating to a first radio access. The power is to be shared with a second radio access within the base station. The base station is arranged to communicate with a number of user equipments using the first radio access. The base station comprises a control processor configured to estimate a statistic power distribution of transmit power to said user equipments during a frame. The control processor is further configured to calculate a margin of power not to be shared with the second radio access, based on the estimated statistic power distribution, and to calculate a power to be shared with the second radio access, based on said margin of power.

The margin of power is used when calculating a power to be shared. The margin of power ensures that there is enough new transmit power for a subsequent user equipment using the first radio access when it arrives. This results in that the radio access performance is improved.

Further, this way of calculating the power to be shared with the second radio access, based on said margin of power ensures the first radio access QoS.

A further advantage with embodiments herein is that the method for calculating a power to be shared is cell specific, which adapts the amount of power that may be shared to the cell coverage. Some base stations serves cells that are smaller and need less transmit power for coverage, and these base stations may share more power.

A further advantage with embodiments herein is that it adaptable to traffic variations within cell.

BRIEF DESCRIPTION OF THE DRAWINGS

Embodiments herein are described in more detail with reference to attached drawings illustrating examples of the embodiments in which.

DETAILED DESCRIPTION

Embodiments will be exemplified in the following non-limiting description.

Figure 3:
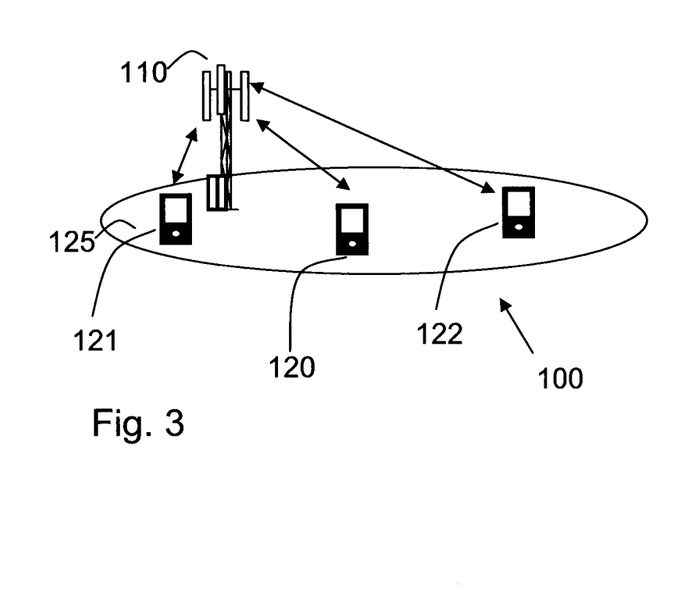
FIG. 3 is a schematic block diagram illustrating embodiments of a wireless communications system.

FIG. 3 depicts a wireless communications system 100 in which the present solution may be implemented.

The wireless communications system 100 comprises a base station 110. The base station 110 supports radio accesses of different standards, and may therefore be referred to as a multi-standard base station. This means that the base station 110 supports at least two radio accesses with different standards, but the base station 110 may support more than two radio accesses. In the following examples the radio base station supports two radio accesses to make the explanation simple, a first radio access and a second radio access. The first radio access is associated with a first radio access standard, such as GSM, WCDMA or LTE. The second radio access is associated with a second radio access standard. The second radio access standard is different from the first radio access standard. In this example, the first radio access is a GSM radio access and the second radio access is a LTE radio access, however in embodiments herein, any other combination may also be possible, such as:

The first radio access being a GSM radio access, and the second radio access being a WCDMA radio access.

The first radio access being a WCDMA radio access, and the second radio access being a GSM radio access.

The first radio access being a WCDMA radio access, and the second radio access being a LTE radio access.

The first radio access being a LTE radio access, and the second radio access being a GSM radio access.

The first radio access being a LTE radio access, and the second radio access being a WCDMA radio access.

The first radio access being a GSM radio access, and the second radio access being a GSM radio access.

The first radio access being a WCDMA radio access, and the second radio access being a WCDMA radio access.

The first radio access being a LTE radio access, and the second radio access being a LTE radio access.

This means that the base station 110 is capable of supporting multiple accesses. This may be depending on which access-specific equipment the base station comprises. As an example a power amplifier of the base station 110 may be capable of transmitting up to four carriers of any accesses at the same time and its transmit power which for example may be of total 60 W may be shared between the carriers. As mentioned above, a carrier here is meant one carrier frequency, that for example may be a 200 kHz BCH or TCH for GSM, a 5 MHz wideband carrier for WCDMA or a LTE carrier of 5, 10 of 20 MHz. Other embodiments of the base station 110 may be able to handle more than four carriers.

The base station 110 applies power sharing, i.e. it applies a change of power used by each carrier, so-called power reallocation, between accesses within the base station 110. According to this example, a power reallocation between the first radio access and the second radio access.

The base station 110 may be a radio base station such as an eNB, eNodeB or any other network unit capable to communicate over a radio carrier with user equipments 120, 121 and 122 being present in a cell 125, which cell 125 is served by the base station 110. Different user equipments use different standards such as e.g. GSM, WCDMA and LTE. In this example the user equipments 120, 121, 122 communicates with the base station 110 using the first radio access of the first standard such as e.g. any of GSM, WCDMA and LTE. The base station 110 is further arranged to communicate with other user equipments, not shown, using the second radio access of the different standard than the first radio access. The user equipments 120, 121, 122 and the other user equipments may be terminals, e.g. mobile terminals or wireless terminals, mobile phones, computers such as e.g. laptops, Personal Digital Assistants (PDA), or any other radio network units capable to communicate with the base station 110 using a radio access.

Figure 4:
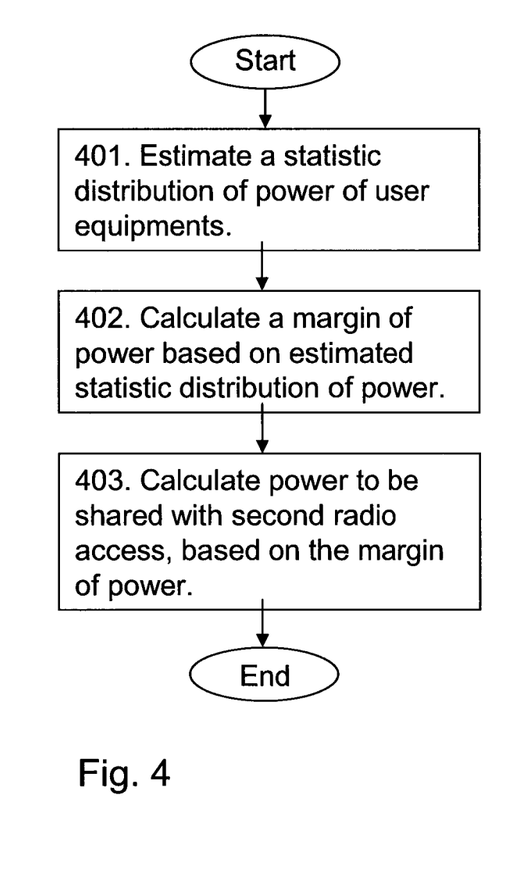
FIG. 4 is a flowchart depicting embodiments of a method.

Embodiments herein will now be described with reference to the flowchart depicted in FIG. 4. These embodiments relates to a method in the base station 110 for calculating a power relating to the first radio access, which power is to be shared with the second radio access within the base station 110. As mentioned above, the base station 110 communicates with a number of user equipments 120, 121, 122 using the first radio access. The method comprises the following steps, which steps are performed by the base station 110. The steps may as well be carried out in another suitable order than described below. The steps may also be referred to as actions.

Step 401

To improve the radio access performance for possible new arriving user equipments, a margin of power that not will be shared with the second radio access is required. To calculate the margin of power an estimation of a statistic power distribution is required. Therefore, in this step the base station 110 estimates the statistic power distribution of transmit power to said user equipments 120, 121, 122 during a time interval. The time interval may e.g. be a frame, therefore the term "frame" is often used in example embodiments herein.

The estimated statistic power distribution may be estimated over a specific period of time. This may be the instantaneous power distribution or measured over several hours or even days and months, the more statistics the better since this enables an accurate estimate of how much power a new arriving user equipment may require. However, it may be beneficial to have some sort of filter function such as e.g. sliding window, of the power statistics, since the power statistics in a cell may change over time.

In some embodiments this action of estimating the statistic distribution of power comprises estimating a maximum of transmit power used during the time interval by any user equipment 121 among said user equipments 120, 121, 122 and/or by any previous user equipment using the first radio access in a previous time interval.

In some embodiments this action of estimating the statistic distribution of power comprises estimating a maximum of transmit power used during the time interval by the estimated statistic power distribution of the first radio access used by user equipment in previous frames.

Maximum transmit power is a simple and fast method to get an estimate of how much transmit power a new user may require.

Step 402

In this step a margin of power not to be shared with the second radio access, is calculated based on the estimated statistic power distribution.

In some embodiments, this calculation may be based on the statistic power distribution used during the time interval by any user equipment 121 among said user equipments 120, 121, 122.

The power margin in embodiments herein is cell specific since it only considers the statistics from the specific cell. For a small cell, the transmit powers to the user equipments are usually relatively low, and for a large cell size the transmit power to the user equipments are high. Thus, by using statistics from each cell, the power margin adapts itself to each specific cell.

In some embodiments the statistic power distribution is represented by the maximum of power used during the time interval by any user equipment 121 among said user equipments 120, 121, 122 and/or by any previous user equipment using the first radio access in a previous time interval. In these embodiments this action of calculating 402 the margin of power not to be shared with the second radio access, is based on said estimated maximum of transmit power or a percentile of said estimated maximum of transmit power. For example, the transmit power of the GSM user equipment 120, 121, 122 with currently highest transmit power in the base station 110 of the cell 125 may be used as a margin when sharing power with LTE, as in this example scenario wherein the first radio access is a GSM radio access and the second radio access is a LTE radio access. As mentioned above, alternatively, the xth percentile of the current or previous user equipment statistics of transmit power may be used as the margin of power. For example, using the 95th percentile of the previous user equipment transmit power statistics for a specific cell ensures that a rather high power margin will be used, and gives a rather low probability, about 5%, that a new GSM user equipment in the specific cell the may not get the required transmit power.

Step 403

The base station 110 then calculates a power to be shared with the second radio access, based on said margin of power.

In some embodiments this action of calculating the power to be shared is performed by deducting a total of transmit power used during a time interval of the first radio access and said margin of power, from an allocated power of the first radio access.

The total of transmit power used during a time interval may be represented by the highest total of transmit power used during a time interval.

In some embodiments mentioned above, the action of calculating 402 the margin of power not to be shared with the second radio access, is based on the estimated maximum of transmit power or a percentile of said estimated maximum of transmit power. For example, the transmit power of the GSM user equipment 120, 121, 122 with currently highest transmit power in the base station 110 of the cell 125 may be used as a margin when sharing power with LTE, as in this example scenario wherein the first radio access is a GSM radio access and the second radio access is a LTE radio access.

Figure 5:
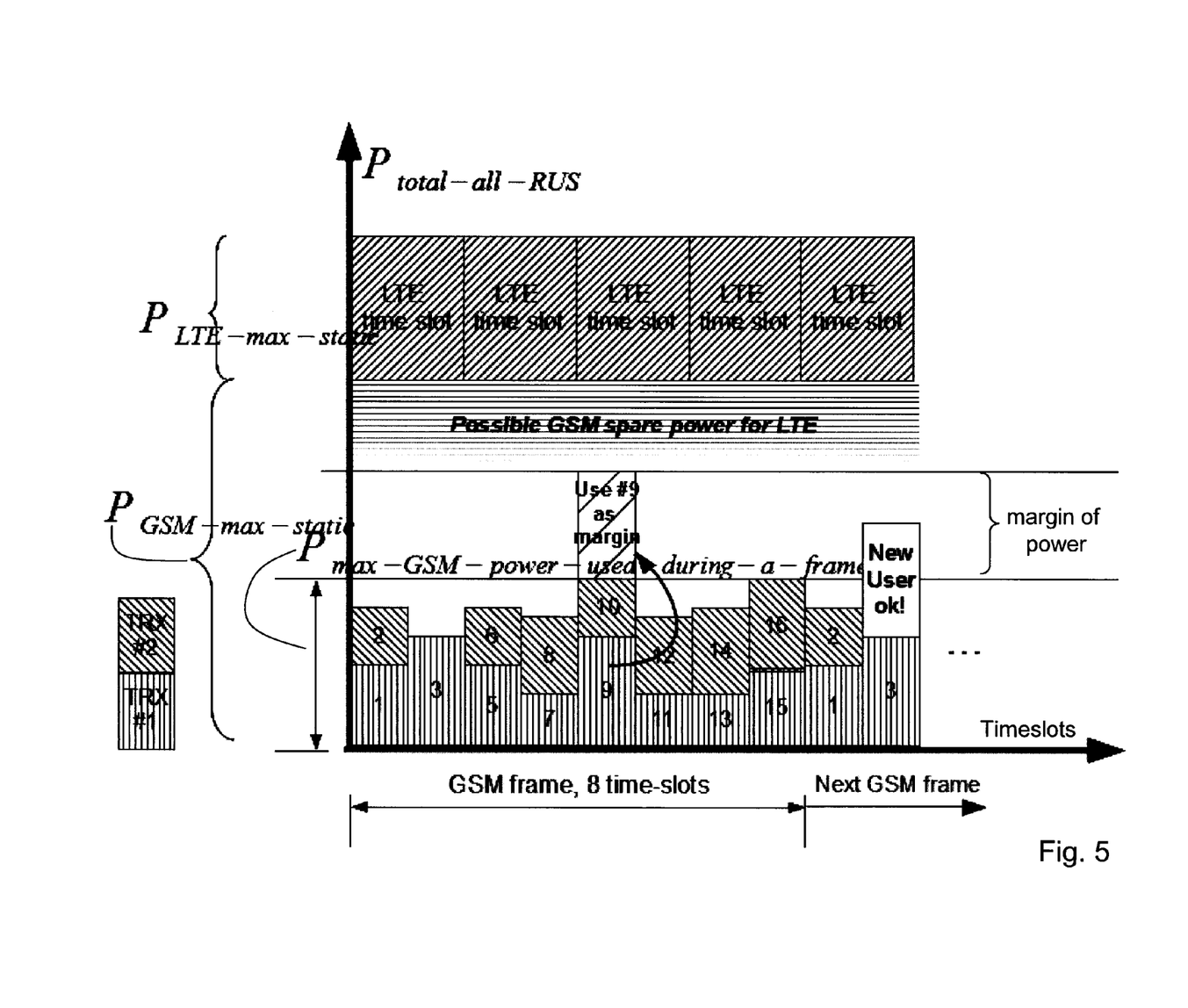
FIG. 5 is a schematic diagram illustrating power sharing according to embodiments herein.

An example of these embodiments is illustrated in FIG. 5, depicting a schematic scheme of power sharing between the first radio access being a GSM radio access and the second radio access being an LTE radio access. The vertical axis represents power and the horizontal axis represents time slots. The lower part of FIG. 5 represents GSM with two transceivers TRX #1 represented by vertical lines and TRX #2 represented by diagonal lines. In FIG. 5 boxes are depicted. In GSM, the time interval may e.g. as in this example be a GSM frame. Each box has a number representing transmit power of a user equipment numbered with that number. Boxes 1, 3, 5, 7, 9, 11, 13 and 15 in GSM time slots in the first GSM frame, and boxes 1 and 3 in GSM time slots in the next GSM frame, represents transmit power used for that respective time slot by TRX #1 symbolized by boxes with vertical lines. Boxes 2, 6, 8, 10, 12, 14, and 16, in the GSM time slots in the first GSM frame, and box 2 in a GSM time slot in the next GSM frame represents transmit power used for that time slot by TRX #2 symbolized by boxes with diagonal lines tilted to the left. The upper part of FIG. 5 represents LTE and shows five LTE time slots. Each LTE time slot is represented by a box with diagonal lines tilted to the right wherein the high of each box represent the maximum power used in this time slot, i.e. $P_{max\ LTE\text{-}static}$.

As can be seen from FIG. 5, the power to be shared which is referred to as possible GSM spare, and is symbolized by horizontal lines in FIG. 5, is performed by deducting the total of transmit power used during a frame i.e. $P_{max\ GSM\text{-}power\text{-}used\text{-}during\text{-}a\text{-}frame}$ of the first radio access and the margin of power, from the allocated power of the first radio access i.e. $P_{max\ GSM\text{-}static}$. I.e. $P_{max\ GSM\text{-}static}$ is the power being allocated for GSM.

I.e. in FIG. 5, the highest total of transmit power used during the frame is in the fifth time slot i.e. the sum of the transmit power of user equipment 9 using TRX#1 and user equipment 10 using TRX#2. The maximum of transmit power is the power of user equipment 9 which is used as the margin of power.

When a subsequent user equipment, using the first radio access arrives, referred to as a "new user equipment" in FIG. 5, the margin of power ensures that there is enough new transmit power for the subsequent user equipment. Further, this way of calculating the power to be shared with the second radio access, based on said margin of power ensures the first radio access QoS. This since the power margin makes sure that there is enough power left for the first radio access for at least one new user equipment using the first power access.

The total of transmit power used during a time interval of the first radio access may be represented by a transmit power of a time slot to which a subsequent user equipment will be allocated in a subsequent time interval. The total of transmit power used during a time interval of the first radio access may also be represented by a minimum transmit power of a time slot. I.e. in some embodiments, this may be the time-slot with the lowest transmit power during a time interval, e.g. a frame, and has a free time-slot that may accommodate a new user equipment. In some embodiments, it is assumed that a subsequent user equipment of the first radio access will arrive but it has not started to transmit yet. A preliminary calculation of the power to be shared with the second radio access may be performed based on the transmit power of a time slot to which the subsequent user equipment is assumed to be allocated in the subsequent frame.

Figure 6:
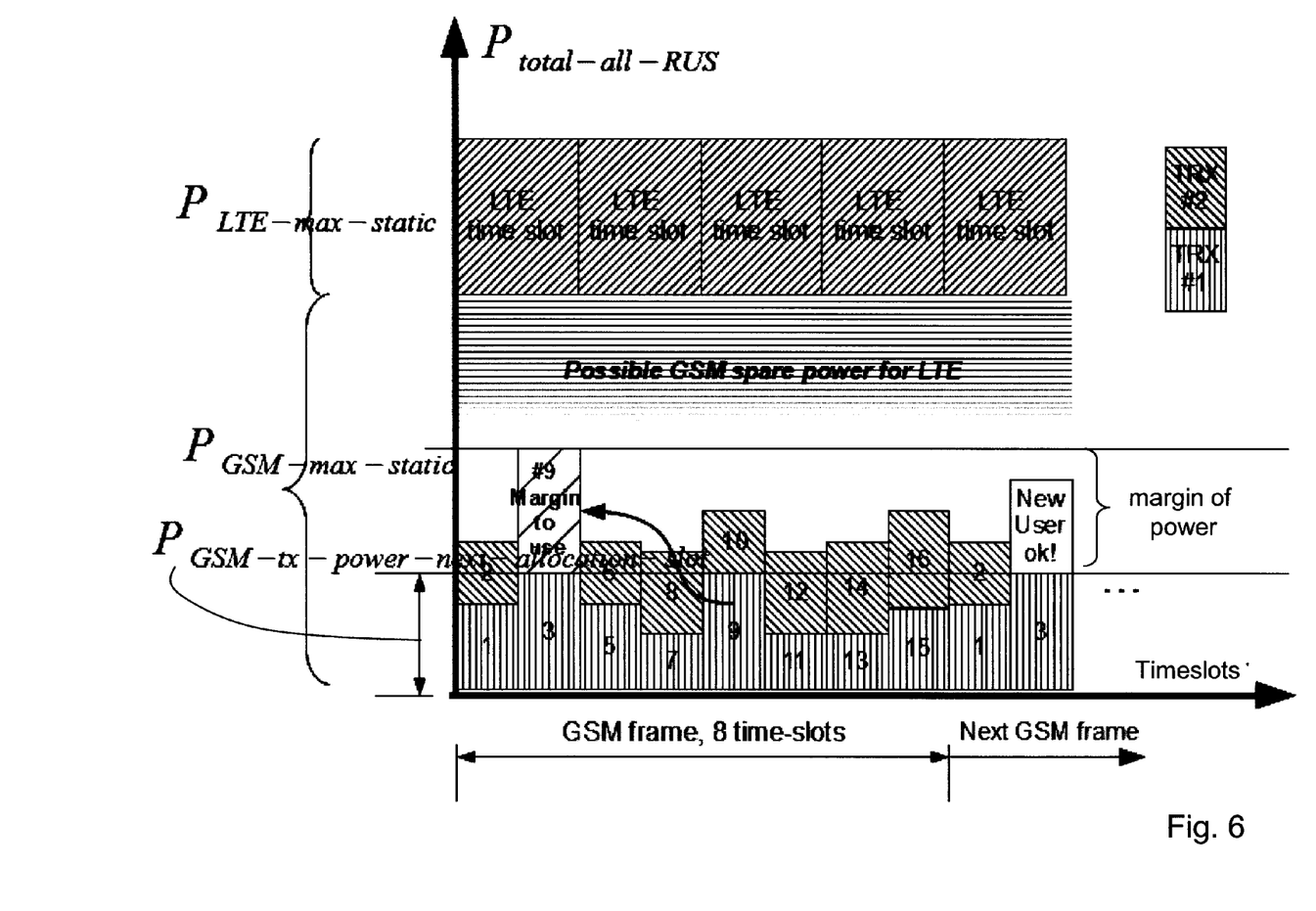
FIG. 6 is a schematic diagram illustrating power sharing according to embodiments herein.

An example of these embodiments is illustrated in FIG. 6, depicting a schematic scheme of power sharing between the first radio access being a GSM radio access and the second radio access being an LTE radio access. The vertical axis represents power and the horizontal axis represents time slots. The lower part of FIG. 6 represents GSM with two transceivers TRX #1 represented by vertical lines and TRX #2 represented by diagonal lines. In FIG. 6 boxes are depicted. Each box has a number representing transmit power of a user equipment numbered with that number. Boxes 1, 3, 5, 7, 9, 11, 13 and 15 in GSM time slots in the first GSM frame, and boxes 1 and 3 in GSM time slots in the next GSM frame, represents transmit power used for that respective time slot by TRX #1 symbolized by boxes with vertical lines. Boxes 2, 6, 8, 10, 12, 14, and 16, in the GSM time slots in the first GSM frame, and box 2 in a GSM time slot in the next GSM frame represents transmit power used for that time slot by TRX #2 symbolized by boxes with diagonal lines tilted to the left. The upper part of FIG. 6 represents LTE and shows five LTE time slots. Each LTE time slot is represented by a box with diagonal lines tilted to the right wherein the high of each box represent the maximum power used in this time slot, i.e. $P_{max\ LTE\text{-}static}$.

As can be seen from FIG. 6, the power to be shared which is referred to as possible GSM spare, and is symbolized by horizontal lines in FIG. 6, is performed by deducting the total of transmit power used during a frame i.e. $P_{max\ GSM\text{-}power\text{-}used\text{-}during\text{-}a\text{-}frame}$ of the first radio access and the margin of power, from the allocated power of the first radio access i.e. $P_{max\ GSM\text{-}static}$.

As mentioned above, in these embodiments the total of transmit power used during the time interval is represented by a transmit power of a time slot to which a subsequent user equipment is assumed to be allocated in a subsequent frame. In some embodiments, this may be the time slot with the lowest transmit power during a frame and has a free time-slot that can accommodate a new, i.e. subsequent user equipment. In the example illustrated in FIG. 6, a subsequent user equipment is assumed to be allocated in a second GSM time slot on TRX #2 since in this example this time slot is not allocated to any user equipment while the other time slots are occupied by other user equipments. The total of transmit power used during the frame is therefore only the transmit power of user equipment 3 also using the second time slot but on(?)TRX #1.

The maximum of transmit power is the power of user equipment 9 which is used as the margin of power.

In some embodiments the total of transmit power may account for a DTX factor by combining with the estimated maximum of transmit power or percentile of said estimated maximum of transmit power. The total of transmit power $P_{tot}$ may be a sum of $P_{UE}$, where $P_{UE}$ the individual power of a user equipment, and where $P_{UE}=(P_{nom}-P_{pcatt})*(1-DTX)$ wherein $P_{am}$ is the nominal power setting set to maximum, $P_{pcatt}$ is reduced power by regulated power, i.e. channel quality, and DTX is a speech coder's average silence detection, i.e. the fraction of the speech frames when the speech coder detects silence. The advantage with taking the DTX factor into account is when the base station 110 has many carriers, and thereby communicates with many transmitting user equipments, then the probability that all carriers detects voice is unlikely and this may be utilized to increase power sharing if the power sharing not can be allocated back as fast as required for voice to be detected and DTX must be ended. Since this average DTX factor is a statistical measure it is good to combine with the statistical power distribution described above. For example to set the total transmit power to the $95^{th}$ percentile of $P_{UE}$.

If a subsequent user equipment, using the first radio access really arrives, referred to as a "new user equipment" in FIG. 6, the margin of power ensures that there is enough new transmit power for the subsequent user equipment. Further, this way of calculating the power to be shared with the second radio access, based on said margin of power ensures the first radio access QoS.

The steps above may be regularly repeated, for example being performed each x ms, for example 1 ms each LTE TTI or each 0.577 ms GSM timeslot or each 100 ms-1 s to capture GSM power control or new calls set up.

For embodiments where the first radio access is a GSM radio access, the requirement for allocation and or reallocation will follow the variations in the total GSM transmit power, which transmit power is shown in FIG. 1. The following variations may occur:

Time Slot (TS), each time slot is 0.577 ms which is <1 ms. To follow DTX and Voice Activity Factor VAF, i.e. how much of the total time that comprises voice, less than 1 ms reallocation is required.

Power control is performed on a >100 ms basis, therefore a reallocation per 100 ms may be used. Power control has a filter with a time constant that may allow for a slower reallocation than per 100 ms.

User variations, new user arrives, requiring a reallocation per ~1 s. It takes some second after a new call until the transmission on a timeslot is started.

Busy vs. non busy variations requiring a reallocation of sparsely than per 1 hour. As described above, traffic variations may be slow and a slow reallocation may utilize unused power.

A selected time-scale is a design choice based on the possibility to reallocate, and specifically return, power between radio accesses. The faster time reallocation capability the faster time scale is chosen.

Average DTX factor may be taken into account when the time scale is 100 ms or more.

In case the first radio access is WCDMA similar timescales may be foreseen for DTX, user variations and busy vs. non busy. Power control is faster in WCDMA than in GSM requiring faster reallocation time, in the order of e.g. 10 ms.

If the first radio access is WCDMA with HSDPA packet data the time scale is typically 2 ms as the TTI, to be able to return power when new packet arrives. Depending on the QoS and delay requirements longer timescales may be used and the packets may be delayed until power is returned.

If the first radio access is LTE the timescale may typically be 1 ms as the TTI. The same increase of timescale based on QoS and delay requirements as for HSDPA may be used.

Figure 7:
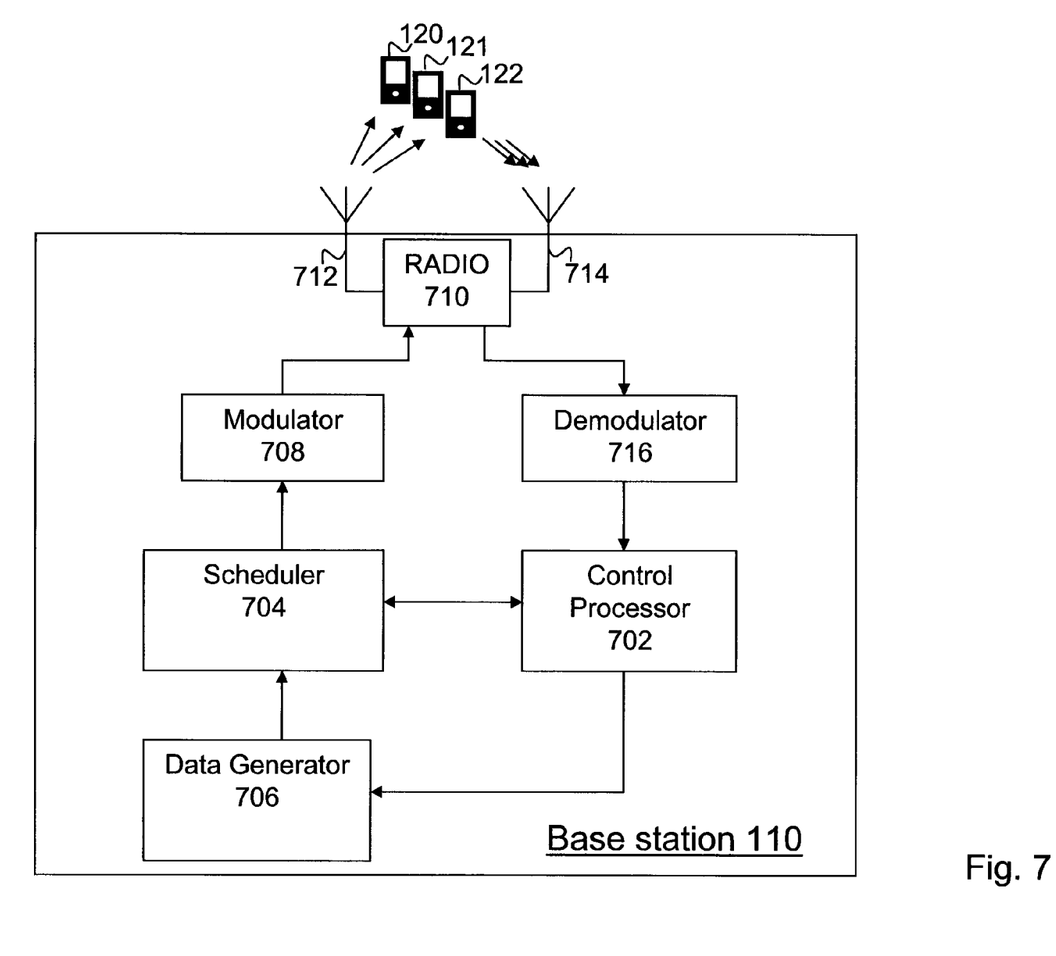
FIG. 7 is a schematic block diagram illustrating embodiments of a base station.

FIG. 7 is a schematic block diagram of a portion of the base station 110, which is typical of the base station 110 in the wireless communications system 100 that may calculate power relating to a first radio access to be shared with a second radio access and implement the methods described above. It will be appreciated that the functional blocks depicted in FIG. 7 may be combined and re-arranged in a variety of equivalent ways, and that many of the functions may be performed by one or more suitably programmed electronic digital processors and other known electronic circuits.

The base station 110 is operated by a control processor 702, which typically and advantageously is a suitably programmed electronic processor. The control processor 702 typically provides and receives control and other signals to and from various user equipments including the user equipments 120, 121 and 122. For simplicity in FIG. 7, the control processor 702 is shown exchanging information with a scheduler 704, which receives digital words to be transmitted to respective user equipments 120, 121 and 122 or to be broadcast from a suitable data generator 706. The scheduler 704 implements resource block (RB) scheduling in an LTE system, for example, implements code allocation in a WCDMA/HSPA system, for example, and implements time slot allocation in a GSM system, for example.

To perform the method steps described above for calculating a power relating to a first radio access, which power is to be shared with a second radio access within the base station 110, the base station 110 comprises the following arrangement. As mentioned above, the base station 110 is arranged to communicate with a number of user equipments 120, 121, 122 using the first radio access.

The control processor (702) in the base station 110 is configured to estimate a statistic power distribution of transmit power to said user equipments 120, 121, 122 during a time interval. In some embodiments the control processor 702 is configured to perform said estimation of statistic power distribution over a specific period of time.

In some embodiments the control processor 702 is further configured to perform the estimation of the statistic power distribution by estimate a maximum of transmit power used during the time interval by any user equipment 121 among said user equipments 120, 121, 122 and/or by any previous user equipment using the first radio access in a previous time interval.

The control processor 702 in the base station 110 is further configured to calculate a margin of power not to be shared with the second radio access, based on the estimated statistic power distribution.

In some embodiments, the control processor 702 is further configured to base the calculation of the margin of power not to be shared with the second radio access, on the statistic power distribution used during the time interval by any user equipment 121 among said user equipments 120, 121, 122.

In some embodiments the control processor 702 is further configured to perform the calculation of the margin of power not to be shared with the second radio access, based on said estimated maximum of transmit power or a percentile of said estimated maximum of transmit power.

The control processor 702 in the base station 110 is further configured to calculate a power to be shared with the second radio access, based on said margin of power.

In some embodiments the control processor 702 is further configured to perform the calculation of the power to be shared, by deducting a total of transmit power used during the time interval of the first radio access and said margin of power, from an allocated power of the first radio access.

In some embodiments, the total of transmit power used during a time interval of the first radio access may be represented by a transmit power of a time slot to which a subsequent user equipment will be allocated in a subsequent time interval. The total of transmit power used during a time interval of the first radio access may also be represented by a minimum transmit power of a time slot.

Information from the scheduler 704 is provided to a modulator 708 that uses the information to generate a modulation signal suitable for the particular wireless communication system. For example, the modulator 708 in an LTE system is an OFDM modulator, in WCDMA a Code Division Multiplex modulator (CDM) and GSM a frequency modulator. The modulation signal generated by the modulator 708 is provided to a suitable radio circuit 710 that generates a wireless signal that is transmitted through at least one transmit antenna 712. Wireless signals transmitted by user equipments 120, 121 and 122 are captured by at least one receive antenna 714 that provides those signals to the radio 710 and a demodulator 716. The artisan will understand that the same antenna may be used for transmission and reception, as is often done in a user equipment.

It will be understood that the control processor 702 may be configured such that it includes one or more other devices depicted in FIG. 7, which may be implemented by dedicated programmed processors or other suitable logic configured to perform their functions. The combination of the data generator 706, scheduler and selector 704, and modulator 708 produces DL time intervals, frames or sub-frames to be transmitted. The modulator 708 converts the information into modulation symbols that are provided to the radio 710, which impresses the modulation symbols on one or more suitable carrier signals. In an LTE system for example, the radio 710 impresses the modulation symbols on a number of OFDM subcarriers, in WCDMA on a code over the whole bandwidth and in GSM on a 200 kHz part of the frequency band. The modulated subcarrier signals are transmitted through the antenna 712.

It will be appreciated that the functional blocks depicted in FIG. 7 may be combined and re-arranged in a variety of equivalent ways, and that connections among and information provided or exchanged by the functional blocks may be altered in various ways to enable a base station to implement the methods described above and other methods involved in the operation of the base station 110 in a digital communication system.

The control unit and other blocks of the base station 110 may be implemented by one or more suitably programmed electronic processors, collections of logic gates, etc. that process information stored in one or more memories. The stored information may include program instructions and data that enable the control unit to implement the methods described above. It will be appreciated that the control unit typically includes timers, etc. that facilitate its operations.

It will be appreciated that procedures described above are carried out repetitively as necessary, for example, to respond to the time-varying nature of communication channels between transmitters and receivers. In addition, it will be understood that the methods and apparatus described here may be implemented in various telecom network nodes.

Moreover, embodiments herein may additionally be considered to be embodied entirely within any form of computer-readable storage medium having stored therein an appropriate set of instructions for use by or in connection with an instruction-execution system, apparatus, or device, such as a computer-based system, processor-containing system, or other system that may fetch instructions from a storage medium and execute the instructions. As used here, a "computer-readable medium" may be any means that can contain, store, or transport the program for use by or in connection with the instruction-execution system, apparatus, or device. The computer-readable medium may be, for example but not limited to, an electronic, magnetic, optical, electromagnetic, infrared, or semiconductor system, apparatus, or device. More specific examples (a non-exhaustive list) of the computer-readable medium include an electrical connection having one or more wires, a portable computer diskette, a random-access memory (RAM), a read-only memory (ROM), an erasable programmable read-only memory (EPROM or Flash memory), and an optical fiber.

The invention claimed is:

1. A method in a base station for calculating a power relating to a first radio access, which power is to be shared with a second radio access within the base station, the base station communicating with a number of user equipments using the first radio access, the method comprising:
   estimating a statistic power distribution of transmit power to said user equipments during a time interval;
   calculating a margin of power to be allocated for a subsequent user equipment using the first radio access and not to be shared with the second radio access, based on the estimated statistic power distribution, before the subsequent user equipment arrives;
   calculating a power to be shared with the second radio access, based on said margin of power, wherein calculating the power to be shared comprises deducting a total of transmit power used during the time interval of the first radio access and said margin of power, from an allocated power of the first radio access; and
   controlling power sharing between the first and second radio accesses, based on said margin of power.

2. The method according to claim 1, wherein said estimated statistic power distribution is estimated over a specific period of time.

3. The method according to claim 1, wherein calculating said margin of power not to be shared with the second radio access is based on the statistic power distribution used during the time interval by any user equipment among said user equipments.

4. The method according to claim 1, wherein estimating the statistic power distribution comprises estimating a maximum of transmit power used during the time interval to any individual user equipment among said user equipments and/or by any previous user equipment using the first radio access in a previous time interval.

5. The method according to claim 4, wherein calculating said margin of power not to be shared with the second radio access is based on said estimated maximum of transmit power to a user equipment or a percentile of said estimated maximum of transmit power to the user equipment.

6. The method according to claim 1, wherein the total of transmit power used during a time interval of the first radio access is represented by a transmit power of a time slot to which the subsequent user equipment will be allocated in a subsequent time interval.

7. The method according to claim 1, wherein the total of transmit power used during a time interval of the first radio access is represented by a minimum transmit power of a time slot.

8. The method of claim 1,
wherein calculating said margin of power comprises calculating said margin of power to be allocated for the subsequent user equipment using the first radio access, before calculating the power to be shared with the second radio access.

9. The method of claim 1,
wherein the first and second radio accesses comprise GSM and LTE, respectively,
wherein estimating the statistic power distribution comprises estimating a maximum GSM transmit power used by an individual user equipment among said user equipments, and
wherein calculating said margin of power comprises using the maximum GSM transmit power as said margin of power to be allocated for the subsequent user equipment using GSM, before calculating the power to be shared with LTE.

10. The method of claim 1,
wherein estimating the statistic power distribution comprises estimating a maximum transmit power used by an individual user equipment among said user equipments via the first radio access, and
wherein calculating said margin of power comprises using the maximum transmit power, used by the individual user equipment via the first radio access, as said margin of power to be allocated for the subsequent user equipment using the first radio access, before calculating the power to be shared with the second radio access.

11. A base station for calculating a power relating to a first radio access, which power is to be shared with a second radio access within the base station, the base station being arranged to communicate with a number of user equipments using the first radio access, the base station comprising a control processor configured to:
estimate a statistic power distribution of transmit power to said user equipments during a time interval;
calculate a margin of power to be allocated for a subsequent user equipment using the first radio access and not to be shared with the second radio access, based on the estimated statistic power distribution, before the subsequent user equipment arrives;
calculate a power to be shared with the second radio access, based on said margin of power, wherein the control processor further is configured to perform the calculation of the power to be shared, based on deducting a total of transmit power used during the time interval of the first radio access and said margin of power, from an allocated power of the first radio access; and
control power sharing between the first and second radio accesses, based on said margin of power.

12. The base station according to claim 11, wherein the control processor is configured to perform said estimation of statistic power distribution over a specific period of time.

13. The base station according to claim 11, wherein the control processor further is configured to perform the calculation of said margin of power not to be shared with the second radio access, based on the statistic power distribution used during the time interval by any user equipment among said user equipments.

14. The base station according to claim 11, wherein the control processor further is configured to perform the estimation of the statistic power distribution based on estimating a maximum of transmit power used during the time interval to any individual user equipment among said user equipments and/or by any previous user equipment using the first radio access in a previous time interval.

15. The base station according to claim 14, wherein the control processor further is configured to perform the calculation of said margin of power not to be shared with the second radio access, based on said estimated maximum of transmit power or a percentile of said estimated maximum of transmit power.

16. The base station according to claim 11, wherein the total of transmit power used during a time interval of the first radio access is represented by a transmit power of a time slot to which the subsequent user equipment will be allocated in a subsequent time interval, or is represented by a minimum transmit power of a time slot.

17. The base station of claim 11, wherein the control processor is configured to:
calculate said margin of power to be allocated for the subsequent user equipment using the first radio access, before calculating the power to be shared with the second radio access.

18. The base station of claim 11,
wherein the first and second radio accesses comprise GSM and LTE, respectively, and
wherein the control processor is configured to:
estimate a maximum GSM transmit power used by an individual user equipment among said user equipments; and
use the maximum GSM transmit power as said margin of power to be allocated for the subsequent user equipment using GSM, before calculating the power to be shared with LTE.

* * * * *